Figure 6:
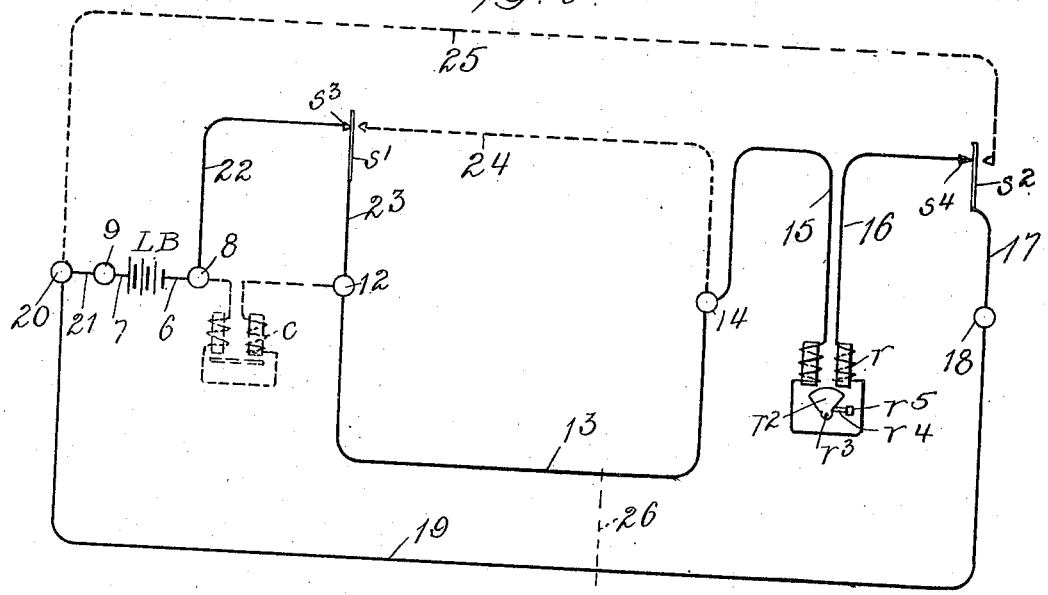

J. G. NOLEN.
SIGNALING SYSTEM AND APPLIANCES.
APPLICATION FILED MAR. 8, 1906.
948,738.
Patented Feb. 8, 1910.
4 SHEETS—SHEET 1.
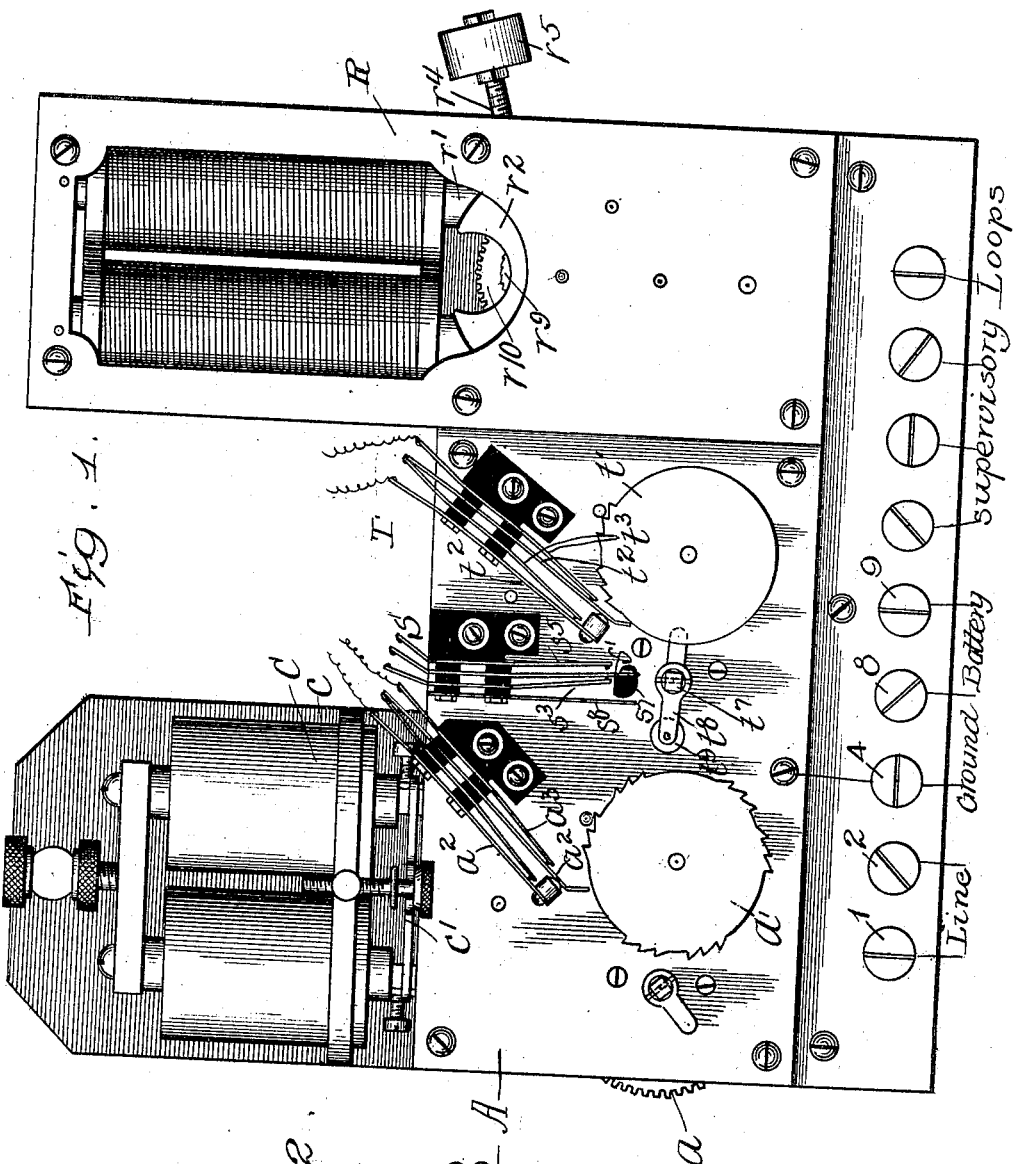
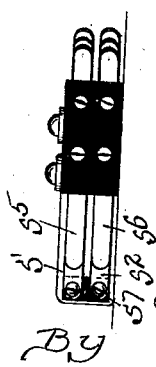
Witnesses
Harry R. L. White
Ray White
Inventor
James G. Nolen,
By Gore Painter May
Attys

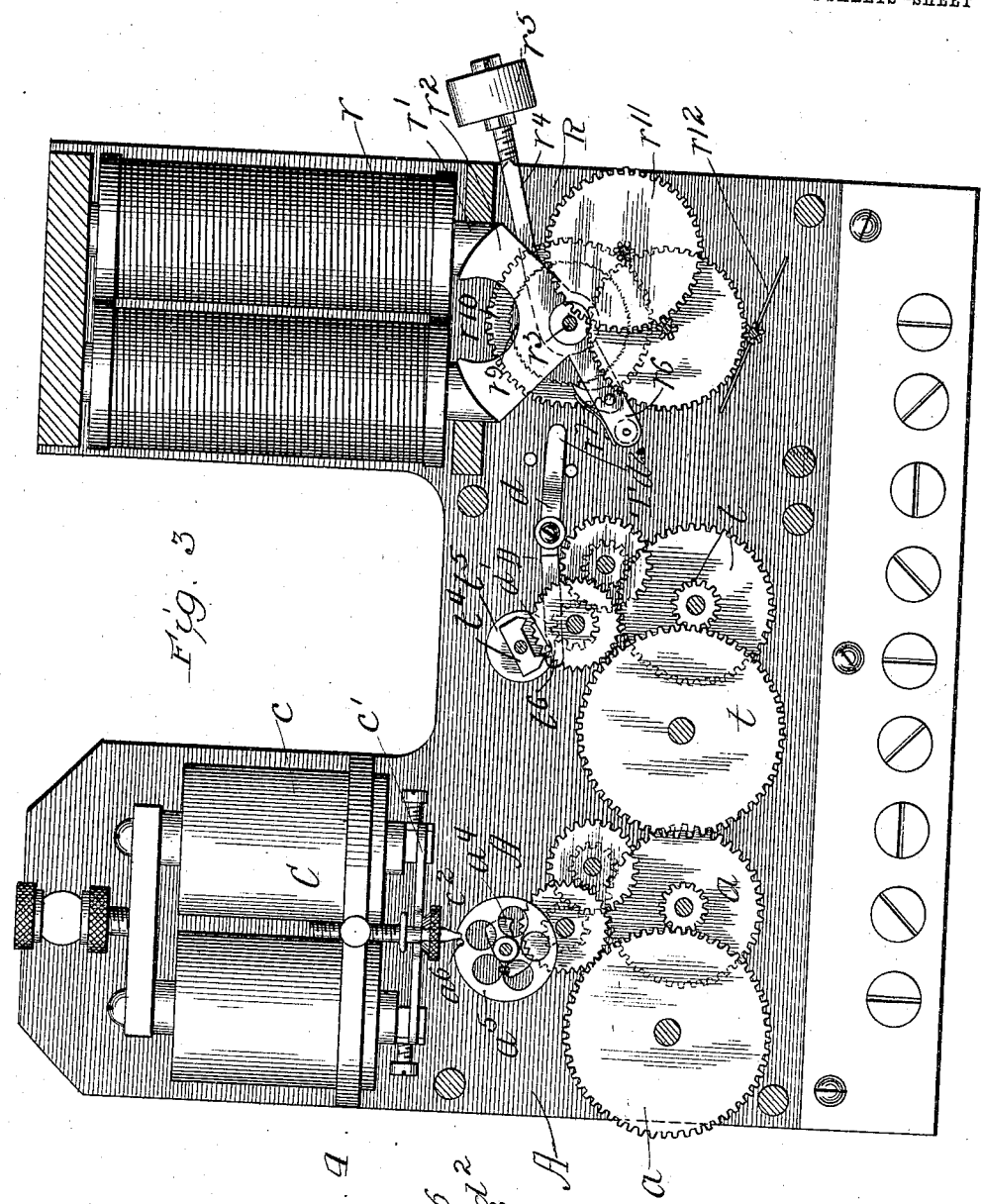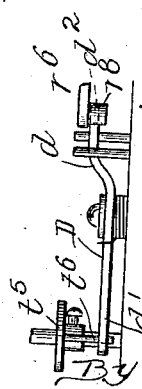

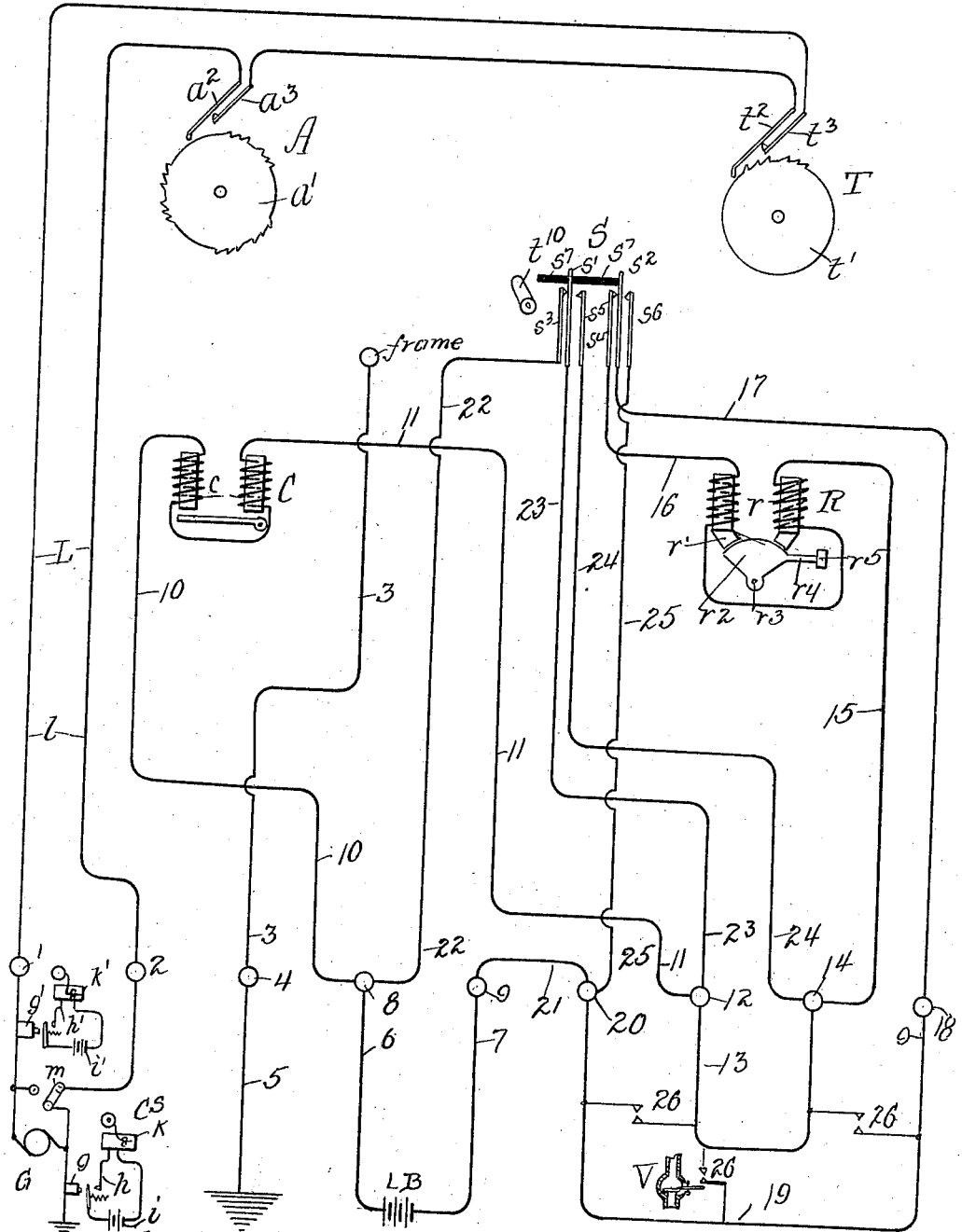

J. G. NOLEN.
SIGNALING SYSTEM AND APPLIANCES.
APPLICATION FILED MAR. 8, 1906.

948,738.

Patented Feb. 8, 1910.
4 SHEETS—SHEET 4.

Witnesses
Harry R. L. White.
Ray White.

Inventor
James G. Nolen,
By Goree Bain & May
Attys

UNITED STATES PATENT OFFICE.

JAMES G. NOLEN, OF CHICAGO, ILLINOIS, ASSIGNOR TO JOHN E. SHEPHERD, OF CHICAGO, ILLINOIS.

SIGNALING SYSTEM AND APPLIANCES.

948,738.  Specification of Letters Patent.  Patented Feb. 8, 1910.

Application filed March 8, 1906. Serial No. 304,811.

*To all whom it may concern:*

Be it known that I, JAMES G. NOLEN, a citizen of the United States, residing at Chicago, in the county of Cook and State of Illinois, have invented certain new and useful Improvements in Signaling Systems and Appliances, of which the following is a specification.

My invention relates to signaling systems and appliances, and has among its salient objects to provide a system of electric supervision of the conditions existing in certain areas or devices, which system will involve the transmission of signals upon the occurrence of certain conditions in the area or device supervised, distinguishable from signals transmitted upon the occurrence of undue conditions in the signaling system itself.

Another important object of my invention is to provide a retarded transmission device wherein the conditions in an associated circuit so influence the transmitter that it will operate to transmit a signal only after the maintenance of definite conditions in the circuit for a predetermined time.

Another object of my invention is to provide an efficient and reliable retarded motor-controlling apparatus.

A further object of my invention is to provide a signaling system involving a two wire protective or supervisory circuit, associated with an alarm transmitter and a trouble transmitter, so that the alarm transmitter responds only to the establishment of some predetermined condition in the protective circuit—such for instance as the establishment of a cross between the protective circuit wires—while the trouble alarm is responsive to abnormal conditions in the circuit such as the breaking of one or both of the protective circuit wires.

Yet another object of my invention is to so arrange such equipment that the rupture of one or both protective wires does not disable the alarm transmitter to perform its function upon the subsequent establishment of the condition to which it is responsive.

Yet another object of my invention is to provide suitable mechanism in association with the transmitters to insure the responsiveness of the alarm transmitter to the signal initiating condition when the normal circuit conditions have been deranged by the existence of trouble as described.

With a view to attaining these and other objects which will best become apparent to those skilled in the art from the following description, taken in conjunction with the accompanying drawings, wherein I have illustrated an operative embodiment of my invention, my invention consists in the combinations and arrangements of parts and devices hereinafter claimed.

Figure 7:
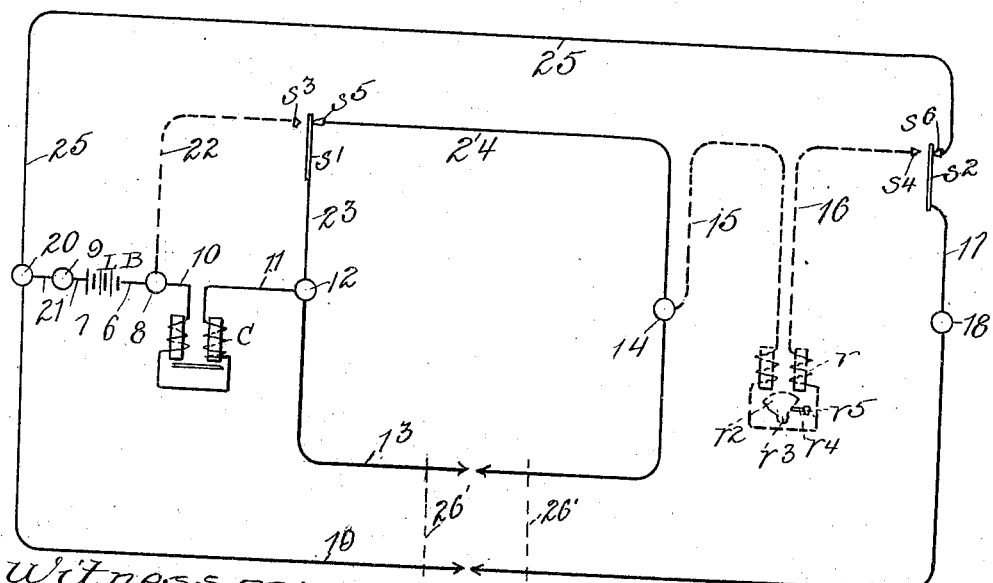

In said drawings: Figure 1 is a front elevation of a structure combining a trouble transmitter, an alarm transmitter and an automatic switch device. Fig. 2 is a detail of the pen structure shown in Fig. 1. Fig. 3 is an elevation of the construction shown in Fig. 1, with the front plate of the transmitters and the signaling instrumentalities removed, to show the motor mechanism. Fig. 4 is a detail of the motor disabling lever showing its association with the motor and timing mechanism. Fig. 5 is a diagrammatic view illustrating the circuit connections of the parts shown in Figs. 1 and 3. Fig. 6 is a simplified diagram of the local circuits under normal conditions and, Fig. 7 is a similar diagram showing the circuits under conditions of trouble.

Throughout the drawings like characters of reference refer always to like parts.

Referring first to the electro-mechanical construction shown in Figs. 1 and 3, A indicates in general the "alarm" transmitter, C its controlling device, T the "trouble" transmitter, R its retarding controller and S an automatic switch operated by the transmitter T. These parts are, for convenience, preferably associated in a single structure for inclosure in a unitary casing.

Referring to the "trouble" transmitter T; $t$ indicates in general a clock work motor involving a gear train, which, it will be understood, may be spring driven in the usual manner.

$t^1$ is a signal wheel of any ordinary type, carried by the arbor of one of the members of the train, with which coöperates the circuit breaking pen $t^2$, normally bearing upon and closing contact with an anvil $t^3$ To provide a double break, double pens and anvils may preferably be provided, as a matter of detail, as shown in Fig. 1.

$t^4$ indicates the pallet of the escapement, upon the arbor whereof is mounted a disk $t^5$ provided with a pin $t^6$ for coöperation with a disabling device to be hereafter described.

Upon the winding shaft $t^7$ of the motor is provided a switch operating lever $t^8$ bearing a roller $t^9$ at its extremity, and adapted as the motor approaches its unwound or rundown condition to act upon the automatic switch S to shift the position of its movable members.

The disabling device of the motor, generally indicated as D in Figs. 3 and 4, comprises a pivoted lever $d$ one end of which is notched as at $d'$ and arranged to coact with the pin $t^6$ of the escapement mechanism to stop or prevent the running of the motor under normal conditions.

The lever $d$ is normally maintained in motor-disabling position by the weight of its opposite extremity $d^2$, which projects into the path of a moving part of the controlling device, to be described, and which is susceptible of movement by said part of the controlling device to such raised position that the notched end $d'$ of said disabling lever is removed from the path of oscillation of the pin $t^6$ to permit the train to run freely,—if potentially conditioned so to do by the winding of the spring.

The retarding controller, generally indicated as R, comprises generally an electro-magnet $r$ controlling the position of an armature, with which is associated a moving part, definitely timed in its movement, and associated with the disabling lever to move it to unlatched or motor-releasing position after predetermined movement at its timed rate of motion.

More specifically the magnet $r$ is provided with curved pole pieces $r^1$, and a curved armature $r^2$ pivoted as at $r^3$. Mounted for movement with the armature is a weight arm $r^4$ carrying an adjustable weight $r^5$ at its extremity, and with the armature is also mounted a lever arm $r^6$ provided at its end with a dog $r^7$ and a roller $r^8$. The armature and the arms moving therewith are loosely mounted on the shaft $r^3$ upon which is tightly fixed a ratchet $r^9$ and gear $r^{10}$, the former being associated with the pawl $r^7$ to be moved thereby in one direction, and the latter being geared through a suitable train generally indicated as $r^{11}$ to a fan or fly $r^{12}$. These parts are so arranged that as long as the magnet $r$ is energized the armature $r^2$ stands in the normal or erect position shown in Fig. 3, with the weighted arm $r^4$ elevated and the arm $r^6$ depressed. When, however, the magnet is deënergized the weight $r^5$ promptly starts to descend, in its descent rotating the armature $r^2$ and elevating the lever arm $r^6$. Descent is retarded, however, by the fly or fan $r^{12}$ as the pawl carried by the lever arm $r^6$ engages its ratchet $r^9$ during this movement of the parts. After a predetermined lapse of time, however, regulable, within limits, by adjustment of the weight $r^5$, the lever arm $r^6$ is raised to such an extent that its roller $r^8$ strikes and elevates the extremity $d^2$ of the disabling lever $d$ to release the trouble transmitter train as heretofore described.

The alarm transmitter A comprises a spring driven train arranged to drive at a suitable rate of rotation a number wheel $a'$ with which coacts the double pen and anvil $a^2$, $a^3$, similar to those provided in the "trouble" transmitter. The toothed arrangement of the wheel $a'$ is preferably dissimilar to that of the signal wheel $t'$ in the number of repetitions of the signal number upon its periphery, and the mechanism is preferably so arranged that in the running down of the transmitter motor mechanism the wheel $a'$ is rotated a plurality of times.

With the pallet $a^4$ of the train is associated a wheel $a^5$ bearing a pin $a^6$, which during the operation of the motor vibrates rapidly.

The controlling mechanism C comprises an electro-magnet $c$ the armature of which $c'$ is provided with a pin $c^2$ arranged when the armature is unattracted and depressed to intercept the path of movement of the pin $a^6$ of the escapement mechanism, and when raised or attracted, to be moved from such path.

The switch S, heretofore referred to, comprises preferably a double set of three contacts, of which, as best shown in Fig. 2, $s^1$ and $s^2$ represent the longer, movable springs, $s^3$ and $s^4$ represent the upper springs or anvils with which the longer, movable springs $s^1$ and $s^2$ respectively normally make contact, and $s^5$ and $s^6$ represent back springs, normally non-contacting with the respective springs $s^1$, $s^2$, but adapted to receive said springs respectively in contact when the switch is actuated by the switch lever $t^8$ of the "trouble" transmitter. The switch members $s^1$, $s^2$ are arranged to move together through the interposition there-between of an insulating block $s^7$, and in practice to protect the insulating block $s^7$ and to give good surface for the roller $t^9$ to act on, a spring metal leaf $s^8$ is provided, as shown in Fig. 1.

Referring now to the circuit diagram shown in Figs. 5 to 7, it will be seen that the pens of the signal transmitters A and T are connected in a line circuit L extending to some suitable supervisory station, which may be a central station removed at any distance from the location of the transmitter, while the electro-responsive devices constituting part of the controller C and retarded controller R are included in a protective supervisory circuit system, herein illustrated as a distinct, locally-energized circuit.

Referring to Fig. 5 C S indicates a central station equipped with the usual grounded generator G, and relays $g$, $g'$, one in the ground branch of the generator and the other in the main line, said relays respectively controlling the local circuits $h$, $h'$ energized by batteries $i$, $i'$, and containing the signal responsive instruments $k$, $k'$, all of any usual or preferred construction. $m$ indicates a switch having its post constantly connected to one side of the line, and a blade arranged for connection to either terminal of the generator. From the generator G a line wire $l$ extends to binding post 1 of the instrument shown in Fig. 1, and thence in series through the pens and anvils $t^3$, $t^2$, and $a^3$, $a^2$, returning through binding post 2 to the central station and the other side of the generator.

For purposes of signaling through either side of the line and a ground return a connection is established from signaling wheels $a'$, $t'$ through the clock frame by wire 3 to a binding post 4, thence by wire 5 to ground.

A local source of current supply, such as a local battery $l\,b$, is provided at the station to be protected, and is connected by wires 6 and 7 to binding posts 8 and 9 respectively. From the binding post 8, a wire 10 extends to the magnet $c$ of the controller C of the alarm transmitter, and from the other side of said coil extends a wire 11 to a binding post 12, with which is connected a wire 13 constituting one of the pair of supervisory wires, said wire 13 being looped through the area to be supervised and connected with the binding post 14, to which is also connected a wire 15 extending to the magnet coils $r$ of the retard controller R, the opposite side of which is connected by wire 16 with the tongue $s^4$ of the switch S, said tongue being normally connected with the spring $s^2$ of said switch, which in turn has connection by wire 17 with the binding post 18. From the binding post 18, the parallel or secondary wire 19, of the supervisory loop extends (usually in physical parallel or paired relation to wire 13) through the area to be protected, to the binding post 20, which has connection by wire 21 with the binding post 9, heretofore adverted to.

A connection in parallel to and short-circuiting the electromagnet $c$ is provided by wire 22 extending from binding post 8 to the switch spring $s^3$ and wire 23, extending from the coacting spring $s'$ to the binding post 12. The rear normally-open contact for the switch spring $s'$ is connected by wire 24 with the binding post 14 and the corresponding spring $s^6$ of the companion set of springs, connected by wire 25 with the binding post 20. Thus, as best shown in Fig. 6, a closed local circuit is normally established, from the local battery L B by wire 7, to binding post 9, thence by wire 21 to the binding post 20, through the supervisory loop wire 19 to binding post 70 18, thence by wire 17 to the switch spring $s^2$, coacting contact $s^4$ by wire 16 to the coil $r$ of the retarded controller R, thence by wire 15 to binding post 14, through the supervisory loop wire 13 to binding post 12, thence by wire 23 to the spring $s'$ and from its contact $s^3$ by wire 22 to binding post 8, which is connected by wire 6 to the opposite side of the battery. A parallel path between the binding posts 8 and 12 is provided through the coil $c$ of the controlling device, C of the alarm transmitter A, but such electro-responsive device remains practically inert because of its high resistance relative to the short circuit path afforded through wires 22 and 23 and the switch parts $s^3$, $s^1$. In this circuit last traced it will be seen that the physically-parallel supervisory wires 13 and 19 are included in electrical series with the electro-responsive device of the retarded trouble transmitter and the local battery L B, the local battery being connected through both of the supervisory wires 13 and 19 as the two sides of a circuit, with the coil of the retarded controller, so that a rupture of either wire or a short circuiting of the wires 13 and 19 so diminishes the current flow to said magnet that it becomes practically deënergized.

Bridging the supervisory circuit wires 13 and 19 are connected signal initiating devices comprising circuit closers 26 normally open, and adapted to be closed to establish a cross between the supervisory wires.

The circuit closers 26 may obviously be operated in any suitable way and may be thermostats, burglar alarm devices, or any other character of signal initiating instruments.

For disclosure of one particular utilization of my invention, however, I have shown in Fig. 5 at V a check valve of a fire extinguisher system having operative connections with one of the circuit closers 26, to close the circuit each time the valve is raised.

Assuming now the valve to be raised or any circuit closer 26 in any way closed, the operation of the parts is as follows, as may be best understood from the simplified diagram in Fig. 6; from the battery L B a closed circuit is established through wire 6 to binding post 8, by wire 22 to contact $s^3$ from the spring $s'$ by wire 23 to binding post 12, thence by wire 13 through the short circuit 26 and back by wire 19, binding post 20, wire 21, binding post 9, and wire 7 to the opposite side of the battery. This short-circuit practically deënergizes the electromagnet $r$ of the trouble transmitter, so that the weight $r^5$ causes the armature $r'$ to turn, and through its ratchet and pawl connection with the clock train, sets the fly or fan $r^{12}$ in motion. After the lapse of a predetermined time, determined by the adjustment of the weight $r^5$, the roller $r^8$ carried by the arm $r^6$ strikes the disabling lever $d$ depressing its notched end and releasing the vibrating pallet, so that under the impulse of its spring, the motor of the trouble transmitter T begins to rotate the signal wheel $t'$. The rotation of the signal wheel $t'$ obviously causes interruptions of the main circuit L causing the operation of the signal register at the central station in the usual and well understood manner. The signal sent by the trouble transmitter is one round, in the present illustration the number 33. When now the trouble transmitter has completed its signal the roller $t^9$ carried by the switch operating arm $t^8$, strikes the plate $s^8$ depressing it upon the insulating block $s^7$ and shifting the companion switch members $s^1$, $s^2$ out of contact with their normally closed contacts $s^3$, $s^4$ and into contact with the normally open contacts $s^5$, $s^6$ respectively. Now if the connection of points $s^1$, $s^3$ and $s^2$, $s^4$ be broken before connection between points $s^1$, $s^5$ and $s^2$, $s^6$ are made, the circuit is changed to the condition illustrated in Fig. 7, there being formed two parallel circuits each completely closed, the one circuit comprising supervisory circuit wire 13, and wires 24 and 23, closed at the switch point $s^5$ and the other circuit including the supervisory circuit wire 19, and wires 25 and 17, the latter being closed at the switch point $s^6$. Between these two closed circuits, or loops, are bridged a battery L B and the coil $c$ of the controller for the alarm transmitter, the short circuit around the magnet of said controller having been broken at the switch point $s^3$, by the operation of the switch. Now, the closed loops including wire 13 and wire 19 respectively having been connected by the signal initiator 26, a circuit is established from the local battery L B by wire 6 to binding post 8, thence by wire 10 through the coils $c$ of the alarm transmitter controller C, by wire 11 to binding post 12, thence through wire 13 to signal initiating device 26 and wire 19, binding post 20 and back by wire 21 binding post 9 and wire 7 to the opposite side of the battery. Accordingly the electro-magnet $c$ of the alarm transmitter controller C is energized, and attracts its armature, thereby releasing the escapement mechanism of the alarm transmitter, so that, if properly wound, or potentially conditioned for operation, said transmitter is released for operation and transmits its predetermined signal of preferably a plurality of rounds—say two rounds—so that it transmits the signal 33 six times, with the specific tooth arrangement shown.

If (considering the circuit and appliances to be in normal condition) one or both of the supervisory circuit wires 13 and 19 be broken, the coil $r$ of the trouble transmitter T is obviously deënergized, so that the transmitter transmits its trouble signal in the manner heretofore described, and upon the completion of its signal, operates the switch S to throw the circuit into the condition shown in Fig. 7. Obviously, however, the alarm transmitter does not operate, as no closed circuit is provided under the new conditions between the poles of the local battery L B. It will further be apparent, however, that even in the event of the break of both supervisory wires the alarm transmitter may yet perform its function, for in the event of a cross, as at 26' (see dotted lines in Fig. 7) upon either side of the double break a closed circuit such as that heretofore described is completed including the local battery and the coil $c$ of the alarm transmitter, so that the transmitter is caused to transmit its signal as heretofore described. Such circuit on the one side will be established through parts L B, 6, 8, 10, $c$, 11, 12, 23, 24, 14, 13, 26, 19, 18, 17, $s^2$, $s^6$, 25, 20, 21, 9 and 7, and on the other side through parts L B, 6, 8, 10, $c$, 11, 12, 13, 26, 19, 20, 21, 9 and 7. If, however, the abnormal conditions caused by the crossing of wires 13 and 19 or the breaking of one of said wires be maintained for a shorter period of time than the predetermined time of retardation of the operation of the trouble transmitter controller, and normal condition be then restored—as for example when the valve V is affected by "water-hammer" to rapidly rise and fall, thereby breaking and making in rapid succession the cross connection 26 between wires 13 and 19—no alarm whatever is transmitted. Whenever the cross occurs the magnet $r$ becomes deënergized and the weighted arm $r^4$ commences to descend, but instantly upon the restoration of normal conditions and reënergization of the magnet $r$ the armature $r^2$ flies back into normal position, the ratchet connections of the lever arm $r^6$ with the train permitting unobstructed movement of the armature in this direction. Consequently false alarms of trouble are never transmitted from "water-hammer" or other effects causing momentary derangement of the circuit conditions from normal conditions.

Under the conditions heretofore described, the controller C for the alarm transmitter A is unretarded, so that after a "trouble" such as a break in a supervisory wire, causing the operation of the transmitter T and a switching of connection at switch S, a subsequent water-hammer momentarily causing the establishment of a cross between the wires 13 and 19 would result in the tripping of transmitter A. This disadvantage is obviated, however, by an arrangement that constitutes of the controller R a retarder for transmitter A under such conditions. By so arranging the switch members that tongues $s^1$ and $s^2$ make contact with tongues $s^5$ and $s^6$ before leaving tongues $s^3$ and $s^4$ such results is obtained.

Harking back now to the operation of the transmitter T in the event of a broken wire, it will be seen that if, after the signal is sent by the transmitter, but before the motor is run down, the switch tongues $s^1$, $s^2$ are closed upon springs $s^5$, $s^6$ but without leaving contact with springs $s^3$, $s^4$, a circuit is established independent of the supervisory wires including parts as follows; L B, 6, 8, 22, $s^3$, $s^1$, $s^5$, 24, 14, 15, $r$, 16, $s^4$, $s^2$, $s^6$, 25, 20, 21, 9 and 7. Accordingly coil $r$ of the controller R is energized and the armature restored to raised position, so that the disabling lever $d$ stops the "trouble" motor train before it has quite run down, thereby holding the circuit in the condition last described. If now, a signal initiating device 26 establishes its cross, as heretofore described, the current will mainly flow through the low resistance path thus provided, through parts L B, 6, 8, 22, $s^3$, $s^1$, 23, 12, 13, 26, 19, 20, 21, 9 and 7, practically deënergizing the coil $r$ of the retard device. Now after the retarded release of the "trouble" motor train, the "trouble" transmitter motor completes its operation, breaking connection between switch members $s^1$, $s^3$ and $s^2$, $s^4$, so that the circuit is established through coil $c$ and wires 10—11, as heretofore described.

While I have herein described in detail an operative embodiment of my invention, which I have practically employed and found to be advantageous in construction and operation, I do not intend to limit my invention to the specific construction and arrangement of mechanical parts or circuits shown and described, as it will be apparent to those skilled in the art that numerous changes in construction and arrangement might be made without departure from the spirit and scope of my invention.

Having thus described my invention, what I claim and desire to secure by Letters Patent, of the United States, is:

1. In a signaling system, the combination of two independently driven signaling wheels, electro-responsive controlling means therefor, suitable circuits for said controlling means, and electrical means operatively controlled by the controlling means for one only of said wheels for preventing the operation of the other of said signaling wheels until the first said wheel has completed its signaling operation.

2. In a signaling system in combination, suitable circuits, two signal transmitting wheels, independent driving means therefor, electro-responsive controlling means for said wheels, normally in association with the circuit to condition one wheel only for operation and to disable the other, and means for automatically varying the relation of said controlling means with the circuit after the operation of the normally operative wheel to condition the other wheel for signal operation and disable the first.

3. In a signaling system in combination, a signal transmitter having an electro-responsive controller, a second signal transmitter having an electro-responsive controller, suitable circuits for said controllers to render them operable to unlike abnormal conditions therein, and electrical means for preventing the operation of the second transmitter until the first said transmitter has completed its operation.

4. In a signaling system in combination, suitable circuits, a signal transmitter having an electro responsive controller normally in operative association with the circuit, a second signal transmitter having an electro-responsive controller normally in inoperative association with the circuit, and means operable by the first said controller for varying the relation of the second said controller with the circuit from inoperative to operative association therewith.

5. In an electric signaling system, in combination, suitable circuits, a signal initiating device therein, two signal transmitters, electro-responsive controllers therefor, one normally influenced by its circuit conditions, and the other normally without the influence of the circuit conditions, and means operable by the first said controller for bringing the second said controller within the influence of the circuit conditions.

6. In a signaling system, in combination, suitable circuits, a signal initiating device therein, a signaling device having an electro-responsive controller normally in the circuit to be influenced by the circuit conditions, a second signal transmitter having an electro responsive device normally without the influence of the circuit conditions, and a switch for varying the circuit connections to render the second responsive device operatively responsive to the action of the signal initiating device upon the circuit, said switch being controlled by the first said transmitter.

7. In a signaling system, in combination, a suitable supervisory circuit, normally energized, a signal transmitter comprising a normally wound motor, an electro-responsive motor-controlling apparatus, said electro-responsive controlling apparatus being normally operatively associated with the said circuit, a second transmitter having an electro-responsive controller, normally uninfluenced by the condition of the said circuit, a switch for varying the association of said second controller with the circuit to render it operatively sensitive to variations in the circuit conditions, said switch being operatively associated with the motor of the first said transmitter for actuation thereby upon the completion of the signaling operation of the first said transmitter.

8. In a signaling system of the character described, a source of current supply, physically parallel supervisory wires, a "trouble" transmitter having an electro responsive controller, normally closed circuit connections establishing connection from opposite poles of the battery through the parallel supervisory wires in series to and including the electro-responsive device of the trouble transmitter, whereby said trouble transmitter is adapted to be conditioned for operation by a rupture of either supervisory wire, an alarm transmitter, an electro-responsive device therefor, and means operable by the trouble transmitter for connecting the responsive device of the alarm transmitter in circuit to render it operable upon the establishment of a cross between the supervisory wires.

9. In combination, suitable circuit connections, two transmitters, electric means for insuring successive operation of the two transmitters, electro-responsive means controlling said transmitters, and means for retarding for a predetermined time the controlling operation of said electro-responsive means.

10. In a system of the character described, two signal transmitters, successively operable electro-responsive means for controlling the actuation of each transmitter, a common means for timing the operation of the controlling means for both transmitters, and suitable circuit connections.

11. In a system of the character described, two signal transmitters, each having an electro-responsive controller, means for insuring operation of the transmitters in predetermined succession, a timing device associated with the controller of the first acting transmitter, and means operative under certain conditions for automatically associating said timing device with the controller of the second acting transmitter to retard its action after the completion of the signal transmission of the first acting transmitter.

12. In a system of the character described, suitable circuits, two transmitters, electric means for insuring successive operation of said transmitters, electro-responsive means controlling said transmitters, and a single means for timing the controlling operations of said electro responsive means with respect to both transmitters.

In testimony whereof I hereunto set my hand in the presence of two witnesses.

JAMES G. NOLEN.

In the presence of—
  GEO. T. MAY, Jr.,
  MARY F. ALLEN.